Sept. 12, 1950  J. T. KRAPP  2,522,127
COUPLING DEVICE
Filed Sept. 14, 1948  2 Sheets-Sheet 1
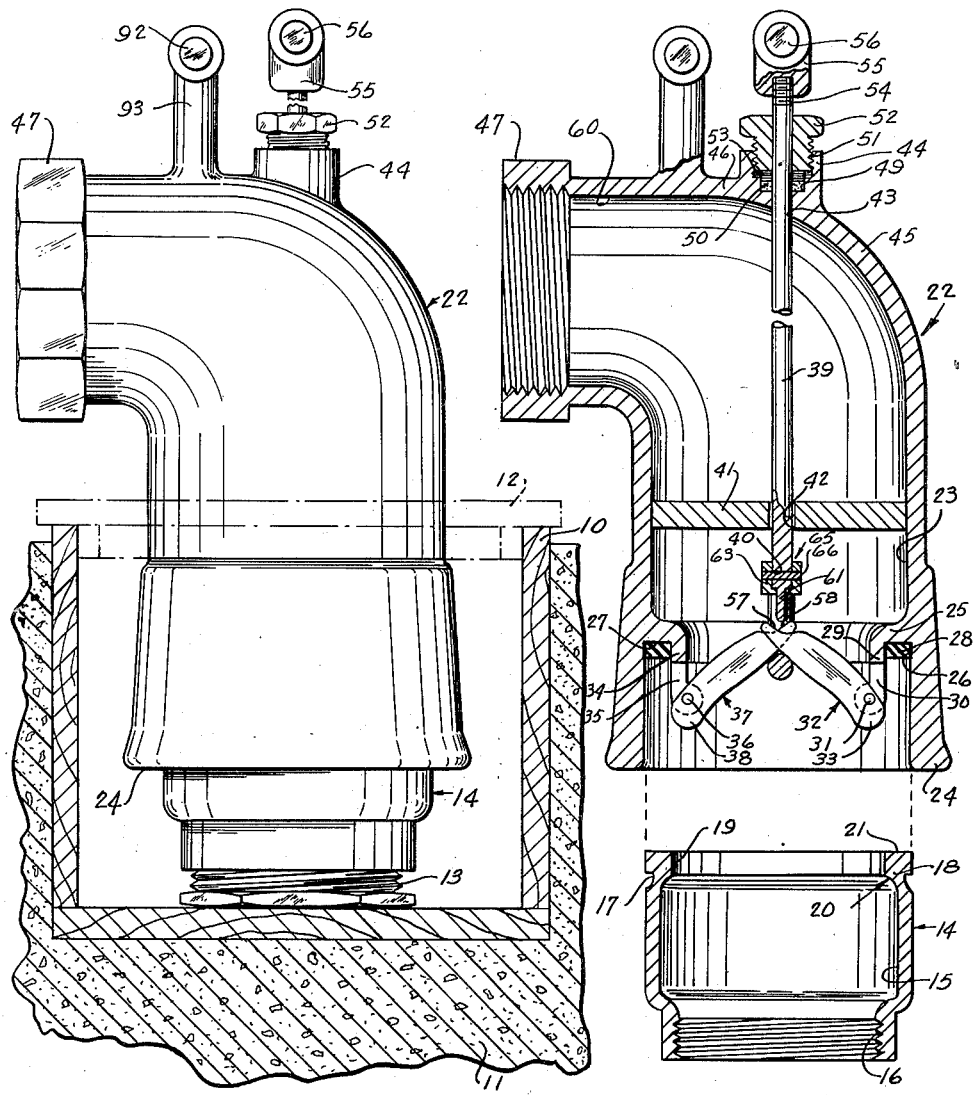
*FIG. 1*  *FIG. 2*
INVENTOR.
JOHN T. KRAPP
BY
ATTORNEY

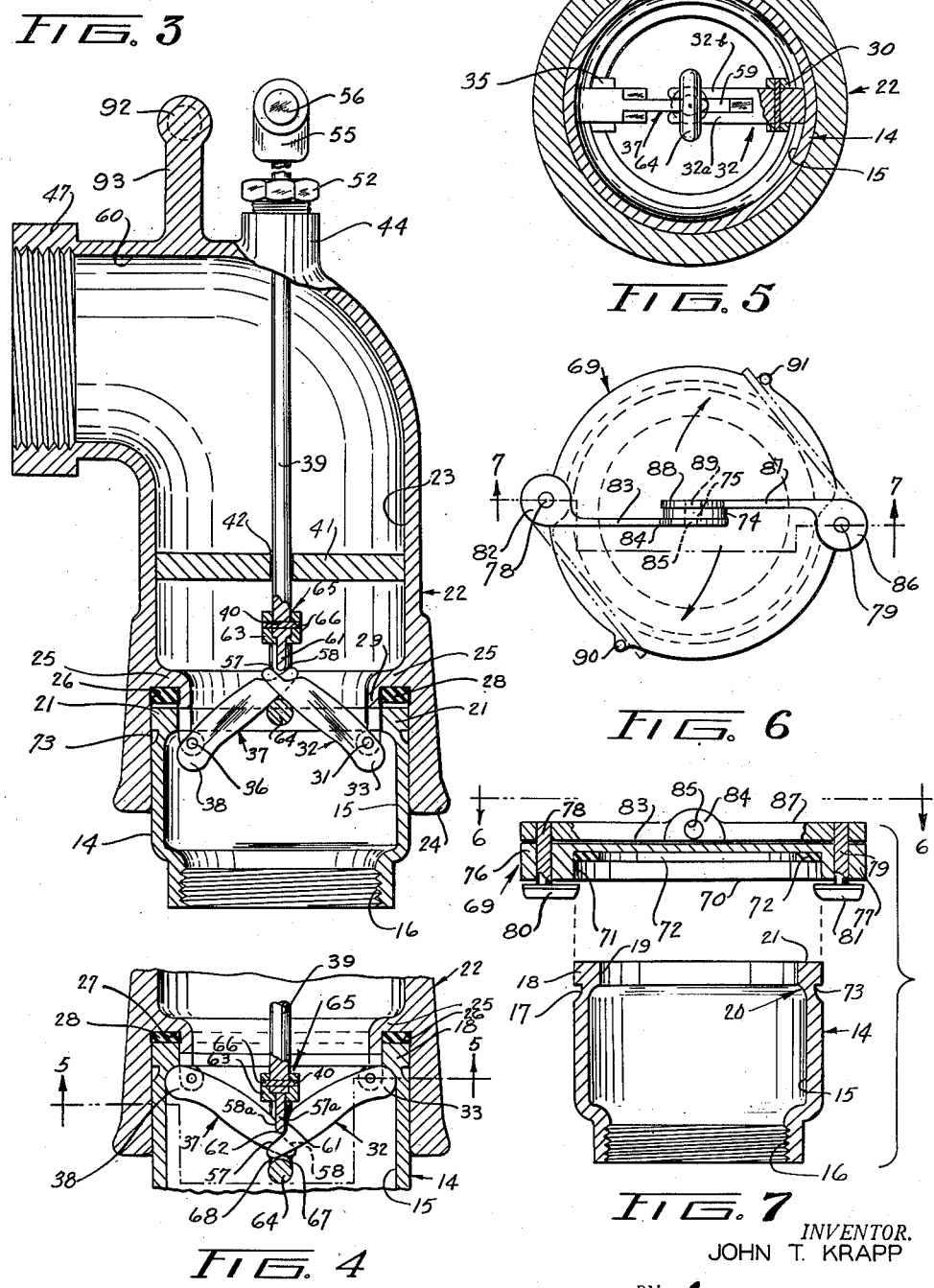

Patented Sept. 12, 1950

2,522,127

UNITED STATES PATENT OFFICE 2,522,127

COUPLING DEVICE

John T. Krapp, Port Washington, N. Y.

Application September 14, 1948, Serial No. 49,190

4 Claims. (Cl. 285—170)

This invention relates to improvements in coupling devices for coupling conduits and the like, and has for an object the provision of quickly attachable and detachable cooperative coupling members which are particularly adapted to be used in confined spaces, and which include means operable during the last step of the operation of coupling said members for locking them in attached relation, and means operable during the first step of uncoupling members for unlocking them.

This application is a continuation in part of application Serial No. 741,969, filed April 17, 1947, and includes improved elements within the coupling members for engaging or disengaging them, and an additional locking feature.

An object of the present invention is to position the leverage members, for forcing the two coupling members together in sealed relation, inside of one of the coupling members, with means operatively connected thereto extending to the exterior thereof, so that the new and improved coupling may be installed in confined spaces.

Yet another object of the invention is the provision of a separable coupling which includes lever operated cams inside one of the coupling members and connected to vertical means adapted, when moved in one direction, to actuate said levers to force the coupling members together in sealed relation and to lock them in said sealed relation, and when moved in the opposite direction, to unlock and unseal said couplings.

Other objects and advantages of the invention will be apparent to those skilled in the art from a study of the specification and the accompanying drawings.

Referring to the drawings:

Figure 1 is an elevational view of my new and improved coupling;

Figure 2 is a cross-sectional elevation of the coupling shown in Figure 1, wherein the two coupling members are separated;

Figure 3 is a cross-sectional elevation of the coupling of Figure 1, shown in section, the two couplings being positioned together before they are locked in sealed relation;

Figure 4 is a fragmentary, sectional view, similar to Figure 3, except that the two coupling members are forced together in sealed relation and positively locked in said relation;

Figure 5 is a sectional view, taken along the lines 5—5 of Figure 4;

Figure 6 is a plan view of a cap, adapted to engage the female coupling member when not in use, and adapted to be locked when in engagement therewith; and Figure 7 is an exploded view taken along the lines 7—7 of Figure 6.

Referring first to Figures 1 to 5, my new and improved coupling is particularly adapted for use in confined spaces, such, for example, as a box 10 which may be set into the ground 11 and which may be provided with a cover 12 when not in use. Extending through the bottom of the box 10 is the end 13 of a pipe or conduit connected to a source of liquid or gas under pressure.

The male fitting 14 of my new and improved coupling has an interior bore 15, the lower end of which is of reduced diameter and is provided with internal threads 16. The upper end 18 of the fitting 14 is substantially the same diameter as the main body of the fitting. Extending into the upper end 18 is a bore 19 which is smaller in diameter than said bore. An annular camming groove 20 is formed in the male fitting 14 between the bore 15 and the bore 19. This camming groove resembles a concave fillet between said bores. It is machined accurately and is engaged by cams to presently be described for forcing the two coupling members or fittings together in sealed relation with the gasket 28 therebetween. The upper end face 21 of the fitting 14 may have its outer edge chamfered, or it may be left square as shown. The end 21 forms a seating face which seats against an annular gasket formed in the female fitting 22, when the fittings are forced into sealing engagement with each other, in a manner to be presently described. The fitting also has on the exterior thereof an annular groove 17, the purpose of which will be explained.

The member 22 is generally tubular in form in its lower portion, and has therein an interior passage 23. Spaced apart from the bottom edge 24 of the fitting 22 is an interior annular boss 25, which is bored out with an undercut bore 26 to form a shoulder 27 against which a gasket 28 may rest. Due to the fact that the bore 26 is undercut, there is no tendency for the gasket 28 to fall out. Formed integral with the annular boss 25 is a depending boss 29, which is bifurcated to form two legs, one of which is shown at 30, and these legs have aligned holes therein to accommodate a pin or shaft 31.

A lever 32 carries on its lower end thereof a cam 33 and has formed therein a hole which is journaled on the shaft 31. The lever 32 is bifurcated to form lever arms 32a and 32b with a space 59 therebetween, which space may be clearly seen in Figure 5. The lever arms 32a and 32b have aligned notches 57 formed in the outer ends thereof, the purpose of which will be presently described. Oppositely disposed to the depending boss 29 within the fitting 22 is a second depending boss 34, which is also bifurcated to form two legs, one of which is shown at 35, and these legs likewise have aligned holes therein to accommodate a shaft 36.

A lever 37 carries on its lower end thereof a cam 38 having a hole therethrough which is journaled on the shaft 36. The lever 37 is of such thickness that it forms a working fit in the space 59 and they are in the positions shown in Figure 2. The levers 32 and 37 cross each other at a point lying on the vertical axis of the interior passage 23. The lever 37 has a notch 58 formed in the other end thereof, and this notch is similar in form to the notch 57 but oppositely disposed.

Extending vertically and substantially on the axis of the interior passage 23 is a rod 39 having a cross hole 40 formed therein in spaced relation to the lower end thereof. The rod 39 has a flat tongue 61 formed on the lower end thereof, and the lower end 62 of the tongue is rounded to form a camming surface. The tongue 61 functions as a key which insures the maintenance of the two members together after they are locked into sealed relation. Referring to Figure 4, which shows the positions of the levers 32 and 37 in the positions where the cams 33 and 38 respectively have locked the members 14 and 22 together, thereby compressing the gasket 28, it will be noted that edges 57a and 58a of the notches 57 and 58 are substantially parallel and the tongue member 61 is between these edges and prevents the levers from moving.

Secured on the lower end of the rod 39 is a yoke member 65 which includes a boss portion 63 and a depending portion 64 which is substantially U-shaped. The boss portion has aligned holes therein through which a pin 66 extends, and this pin also passes through the hole 40 in the rod 39.

As may best be seen in Figure 4, the inner surfaces 67 and 68 in the lower end of the depending portion 64 are angular, and join each other to form an apex which cams against the lower surfaces of the levers 32 and 37 when the rod 39 is moved upwardly to disconnect the members 14 and 22. The apex, it will be noted, is spaced apart from the levers when the tongue 61 is positioned between the edges 57a and 58a of the notches formed in the levers.

When the rod 39 first starts moving upwardly (when the handle 56 is pulled upwardly) the tongue 61 is withdrawn from between the edges 57a and 58a sufficiently to permit the levers 32 and 37 to be moved, by the time the apex 67, 68 of the depending portion 64 engages the lower surfaces of the levers, so that as the handle is pulled on up the apex cams against the lower edges of the levers and moves them up to the positions shown in Figures 2 or 3, so that the members may be separated.

A cross web 41 is positioned within the passage 23 and spaced apart from the internal annular boss 25. Formed in the web 41 is a hole 42 through which the rod 39 extends to form a working fit therewith. The rod 39 also extends through a hole 43 formed in a boss 44. The lower annular wall of the fitting 22 has a curved portion 45 which joins a straight portion 46, which is substantially ninety degrees apart from the vertical wall of the fitting 22, and the wall 46 has a polygonal portion 47 which may be internally threaded to accommodate a fitting and which communicates with an interior bore 60 forming a passage for fluid mediums. The passage 60 is at right angle to the passage 23. It is preferable to form the body of the fitting 22 by means of a casting and therefore the boss 44 is formed integral therewith. The boss 44 has a counterbored portion 49 for containing a gasket 50, and communicating with the counterbored portion 49 is a counterbored portion 51, which is provided with threads to accommodate a packing nut 52, and between the packing nut and the packing 50, a gland 53 may be provided. The purpose of the packing is to permit the rod 39 to be moved up and down in a vertical path and yet prevent the fluid medium within the passages 23 and 60 from escaping to the atmosphere. The upper end of the rod 39 is provided with threads 54 which are engaged by corresponding threads formed in a boss 55, which is preferably formed integral with the handle 56.

Referring now to Figures 6 and 7, I show a cap 69 which is placed on the open end of the member 14 to cover it and seal it during the time the member 22 is detached therefrom.

The cap 69 is formed of a main body 70, which has a counterbore 71 formed therein which fits on the upper end of the coupling member 14. The counterbore 71 has a gasket 72 therein which is adapted to be engaged by the upper face 21 of the member 14, and the member 14 has an external groove 73 formed therein. The upper edge of this groove is horizontal and the lower edge is concave.

Formed on the upper surface of the cap 69 is a semi-circular boss 74 having a lateral hole 75 therein, and oppositely disposed on the rim of the cap 69 are bosses 76 and 77 which have bearing holes therethrough in which shafts 78 and 79, respectively, are journaled.

Fixed on the lower end of the shaft 78 is a cam 80, and fixed on the lower end of the shaft 79 is a cam 81, said cams being adapted to engage the groove 73 when the cap 69 is positioned on the member 14.

Secured to the upper end of the shaft 78 is a boss 82 which has formed integral therewith a lever 83, the outer end 84 of which matches the boss 74. A hole 85 in said outer end is in alignment with the hole 75 when said end abuts the boss 74. Secured to the upper end of the shaft 79 is a lever 87 formed integral with a boss 86, similar to the boss 82. The other end 88 of the lever 87 matches the boss 74 and a hole 89 therein is in alignment with the holes 75 and 85 when the end 88 abuts the boss 74, so that when the levers are in this position they may be locked by means of a padlock passing through the three holes. When the levers are in said position the cams 80 and 81 have engaged and locked with the groove 73.

Formed on the cap in opposite relation are stop bosses 90 and 91 which form limits of the swing of the levers, so that when the lever 83 is swung against the stop 90 and the lever 87 is swung against the stop 91, the cams are disengaged from the groove 73 and the cap may be removed.

In use, the cover 12 may be removed from the box 10, uncovering the fitting 14, following which the cover may be unlocked and the levers swung against the stops 90 and 91 disengaging the cams 80 and 81 from the groove 73, so that the cap 69 may be removed from the member 14. The member 22 may then be picked up by grasping a handle 92, which is formed integral with a vertical boss on the member 22, and it may be let down into the box 10 so that the open bottom portion is in embracing relation with the upper portion of the member 14. When this is done the operator should make sure that the handle 56 and the rod 39, to which it is secured, have moved upwardly as far as it can go so that the cam levers are in the position shown in Figure 2. As the fittings come together in this relation they are in the positions shown in Figure 3.

As soon as the fitting 22 is seated on the male member 14, the handle 56 is forced downwardly to cause the levers to move downwardly, and thereby force the cams 33 and 38 into engagement with the annular groove 20 formed in the fitting 14, with the result that the fitting 22 is cammed downwardly with sufficient force to deform the gasket 28 effecting a fluid-tight seal between the fittings; and the tongue 61 is between the edges 57a and 58a, locking the levers as shown in Figure 4.

To remove the member 22, the operator pulls the handle 56 upwardly, thereby raising the levers to the positions shown in Figures 2 or 3, then grasps the handle 92 and lifts the member 22 off the member 14. Then the cap 69 may be placed on the member 14, making sure the levers 83 and 87 are against the stops 90 and 91, then these levers may be swung to abut the boss 74 and the padlock may be hooked through the aligned holes and locked. After this the cover 12 may be placed on the box 10.

Although I have herein shown and described one embodiment of the invention to illustrate the invention, many changes may be made in the arrangements shown and described within the scope of the claims.

I claim:

1. In a separable coupling device, a tubular male member having a seating face on one end thereof and an anuular camming face therein adjacent said end, a female member including a tubular portion having an internal shoulder therein, a gasket on said shoulder adapted to be engaged by said seating face, cam means journaled in said tubular portion, lever means connected to and adapted to move said cam means, a push rod reciprocally mounted in said second mentioned member and operatively connected to said lever means, said push rod extending through the wall of said second member, an operating handle connected to said push rod, whereby an operator may grasp said handle and actuate said lever means to cause said cam means to act against said camming face and force said seating face of said gasket into tractile engagement, notch means on said levers having edges which cooperate to form a slot when the actuation of said levers is completed and a tongue on the lower end of said push rod adapted to enter said slot and lock said levers against movement.

2. A separable coupling device comprised of a male member having a seating face on one end thereof and an annular engageable surface therein adjacent said end, a female member having a shoulder therein with a gasket thereon, oppositely disposed cams within said second-mentioned member adapted to engage and cooperate with said engageable surface, a bifurcated lever secured to one of said cams, a second lever connected to the other cam and extending into the bifurcation of said first lever so that said first and second levers cross each other, notches formed in said levers near the ends thereof and having edges which cooperate to form a slot when said levers are moved to force said seating face and said gasket into sealed engagement, a rod or shaft extending through the wall of said second member and having means on the lower end thereof cooperating with said levers, and a tongue formed on the lower end of said rod adapted to enter said slot and maintain said sealed engagement.

3. In a separable coupling device, a male member having a seating face on one end thereof and an annular camming face on the interior thereof, a female member including a tubular portion having an internal shoulder with a gasket thereon adapted to be engaged by said seating face, camming means within said second mentioned member, levers connected to said camming means for causing said cams to engage said cam face and force said seating face into sealing relation with said gasket, notches formed in the outer ends of each of said levers which are generally L-shaped in form and having corresponding edges adapted to form a slot when said levers are actuated to effect said sealing relation, a push rod extending through the wall of said second member, a locking tongue formed on the inner end of said push rod and adapted to enter said slot and lock said levers against movement when said sealing relation is effected, and yoke means secured adjacent to the end of said push rod and having camming surfaces therein adapted to engage said levers when said push rod is moved upwardly, the distance between the lower end of said tongue and the lowest end of said inside camming surface being such that said tongue is sufficiently withdrawn from said slot by the time said camming surface engages the opposite sides of said levers to permit them to move, and a handle on the outer end of said push rod for moving the latter in either direction.

4. A separable coupling device comprised of a male member having an end seating face and an annular engageable surface therein in spaced relation to said face, a female member having a shoulder therein with a gasket thereon, oppositely disposed cams journaled in said second member, a lever secured to one of said cams and having a longitudinal slot formed therein, a second lever secured to the other of said cams and extending into said slot so that said levers cross each other on substantially the axis of said member, notches formed in each of said levers near the end thereof, said notches having edges which cooperate to form a slot when said levers are moved to effect said sealed engagement, a rod extending through the wall of said second member and having a tongue on the lower end thereof adapted to enter said last mentioned slot, and a camming member comprised of a boss secured to said rod above said tongue, and a depending portion generally U-shaped and having an apex formed on the interior therein at least at the bottom adapted to engage said levers from bellow when said rod is moved upwardly in said second member to disconnect said coupling members, and the distance between said apex and the lower end of said tongue being such that as said rod is moved upwardly said apex engages said levers as said tongue is withdrawn from said last slot sufficiently to permit said levers to be moved.

JOHN T. KRAPP.

REFERENCES CITED

The following references are of record in the file of this patent:

UNITED STATES PATENTS

| Number | Name | Date |
|---|---|---|
| 373,825 | Gleich et al. | Nov. 29, 1887 |
| 2,460,352 | Jensen | Feb. 1, 1949 |